3,148,933
PROCESS FOR COLORING FIBERS WITH FIBER REACTIVE PHTHALOCYANINE DYESTUFFS AND PRODUCTS OBTAINED THEREBY
David I. Randall, New Vernon, and Wilhelm Schmidt-Nickels, Little York, N.J., assignors to General Aniline & Film Corporation, New York, N.Y., a corporation of Delaware
No Drawing. Filed Dec. 19, 1961, Ser. No. 160,658
13 Claims. (Cl. 8—1)

This invention relates to a novel dyeing process, and more particularly to a process for coloring fibers and the like with a group of dyestuffs effective for producing colored products in any desired shades of improved fastness properties and the like.

A number of dyeing processes are known in which dyeings of improved fastness properties are obtained by reaction between the dyestuff and the fiber. Among the large number of reactive dye classes proposed for use in such processes, only a few are commercially useful. These are the cyanuric, the pyrimidine and the vinyl sulfone or sulfatoethylsulfone types. These types have sufficient reactivity with the fiber to be applied at the usual dyeing temperatures of boiling or below, but are somewhat expensive to produce and are generally not sufficiently stable to or applicable in the wide range of pH conditions often found necessary in treating different types of fibers. Further, the dyeings produced with these dyestuffs have more or less pronounced tendencies to hydrolyze with cleavage of the dye-fiber linkage. For example, the dyestuff-fiber linkages derived from the cyanuric and pyrimidine types of reactive dyes hydrolyze on standing in dilute acids. On the other hand, the dyestuff-fiber linkages derived from reactive dyestuffs of the vinyl sulfone or sulfatoethylsulfone type are not stable to attack by strong aqueous alkali.

It is an object of this invention to provide a novel process for coloring fibers and other articles in any desired shades of improved fastness properties. Another object of this invention is the provision of a process for coloring fibers, particularly textile fibers and the like, which will not be subject to one or more of the above disadvantages. Other objects and advantages will appear as the description proceeds.

The attainment of the above objects is made possible by this invention which comprises a process for coloring fibers containing a reactive hydrogen atom including the step of treating the fibers under acid binding conditions with an aqueous dispersion of a compound having the formula

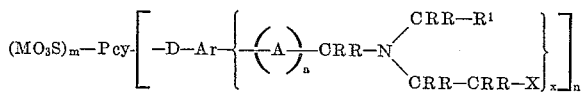

wherein
(a) R and R¹ are monovalent members of the group consisting of H, alkyl, alkynyl, alkenyl, cycloalkyl, aryl, and heterocyclic, and X-substituted derivatives thereof,
(b) X is the anion of a strong acid having a dissociation constant greater than $2.0 \times 10^{-5}$,
(c) Pcy represents a phthalocyanine molecule,
(d) Ar is a pendant aryl radical selected from the group consisting of benzene, naphthalene and diphenyl,
(e) A and D represent divalent aliphatic bridging links selected from the group consisting of —O—, —S—, —SO₂—, —NR—, —CO—, —CRR— and combinations thereof, A being joined to the depicted CRR through a terminal carbon atom, (f) M is selected from the group consisting of H, alkali, ammonium, and amine cations,
(g) $m$ has a value of 0 to 3.
(h) $x$ has a value of 1 to 3.
(i) $a$ has a value of 0 to 1, and
(j) $n$ has a value of at least 1.

It has been found that the process of this invention enables the production of colored products having surprisingly good fastness properties particularly wash fastness and fastness to light and to alkaline and acid perspiration and the like. Further, the process is much more stable to acid and alkaline conditions of application and the resulting colored products have improved stability to both acid and basic hydrolytic cleavage of the dyestuff-fiber linkage.

In the above formula, Pcy may represent an unmetalized phthalocyanine molecule or a metal phthalocyanine molecule of known type. As examples of metal phthalocyanine molecules there may be mentioned copper, cobalt, aluminum, vanadium, tin, zinc, nickel, iron, magnesium, chromium, and other metal phthalocyanines. Further, Pcy may represent, whether metallized or unmetallized, a phthalocyanine molecule unsubstituted or nuclearly substituted by one or more lower alkyls such as methyl, halogen such as chlorine or bromine, or phenyl groups. Ordinarily, the right and left hand portions in the above formula are bonded to fundamental phenylene nuclei in the phthalocyanine molecule. However, when Pcy represents a phenyl-substituted phthalocyanine molecule, none, some or all of the right and left hand portions in the said formula may be bonded to the phenyl substituent or substituents.

In the above formula, A represents a divalent aliphatic bridging link which is joined to the depicted CRR group to the right thereof through a terminal carbon atom. The bridge, if present ($a$ is 1), may contain from 1 to 18 or more linking C, S, O or N atoms in the chain or any combination thereof. Since A is joined to the depicted CRR through a terminal carbon atom, the A bridging link must always include as the right hand terminus a CO or CRR link. The A bridging link may consist of one or a plurality of CRR groups with no hetero atoms in the bridge, or it may contain one or more hetero links such as O, SO₂, S, CO, or NR or combinations thereof, as for example SO₂NR, NRSO₂, CONR, NRCO, SO₂NRNR, OCO, OSO₂, SO₂O, etc. The A bridge may be solely constituted by one or more such hetero links or combinations thereof joined through a terminal carbon atom to the depicted CRR group. It will accordingly be understood that the aforementioned bridging links may be combined in any manner, number and/or order. R in these bridging links is preferably H though it may have any of the values disclosed elsewhere herein.

Ar in the above formula represents a pendant aryl radical selected from the group consisting of benzene, naphthalene and diphenyl joined to the phthalocyanine molecule Pcy through the divalent bridging link D. It will be understood that said pendant aryl radical may contain inert substituents such as lower alkyl and lower alkoxy of 1 to 3 carbon atoms, sulfo, etc. Similarly, the divalent bridging link D is selected from among the same values as described above with respect to bridging link A although it need not be joined to the remainder of the molecule through a terminal carbon atom.

R and R¹ in the above formula may represent H, alkyl of 1 to 18 carbon atoms including stearyl but preferably lower alkyl of 1 to 3 carbon atoms, such as methyl, ethyl, propyl, isopropyl, the corresponding acetylenically unsaturated alkyls (alkynyl), the corresponding ethylenically unsaturated alkyls (alkenyl), benzyl, cyclohexyl, phenyl, naphthyl, furyl, and other heterocyclic groups joined through a carbon atom to the depicted carbon atom, and X-substituted derivatives thereof. It will be understood that these R and $R^1$ groups may be further substituted by inert substituents such as carboxyl, sulfonic, alkoxy, hydroxy, nitro, residues corresponding to a Pcy moiety described above, and the like, and may be chain-interrupted by hetero atoms such as O, S, N, and the like. Preferably R is H and $R^1$ is CRR—X.

In the above formula, X preferably represents a sulfate or chloride anion although it may if desired represent the anion of any other strong acid having a dissociation constant greater than $2.0 \times 10^{-5}$ including for example the anions of hydrobromic, hydrofluoric, iodic (HI), phosphoric, phosphonic, phosphinic, organic sulfonic (sulfonyloxy), trichloracetic, dichloracetic, chloracetic, formic and the like.

It will be noted that the N atom in said fiber-reactive group is bonded to aliphatic carbon atoms only and the R and $R^1$ groups are bonded to said aliphatic carbon atoms through a terminal carbon atom. The R groups on the X-bonded carbon atom may, less desirably, be bonded to said carbon atom through a bridging link of the type described above without unduly affecting the reactivity of said fiber-reactive group with the fiber.

M in the above formula may represent H, alkali metals such as sodium, potassium and lithium, ammonium, or aliphatic, alicyclic, aromatic or heterocyclic amines such as mono-, di-, and tri-ethanol-, -propanol-, -methyl-, -ethyl-, and -propyl-amines, cyclohexylamine, morpholine, pyridine, picoline, and the like.

Dyestuffs of the above formula may be devoid of sulfonic groups (m is zero) in which case they are water insoluble unless X is $OSO_3H$ or equivalent. Since water solubility of the dyestuff is preferred for ease of application thereof, m preferably has a value of 1 to 3, although as previously stated sulfonic acid groups are not necessary when X is a solubilizing group such as $OSO_3H$. The dyestuff may be provided with sulfonic acid groups by sulfonation of the fundamental phthalocyanine molecule or the final dyestuff of the above formula in known manner.

In the above formula, n has a value of at least 1, and usually 1 to 4. Values of up to 8, representing two bracketed substituents in each of the four phenylene rings of the fundamental phthalocyanine nucleus, are also operative although not particularly practical since the inclusion of so many fiber-reactive groups into the phthalocyanine molecule is usually unnecessary and uneconomical.

In the above formula, x has a value of 1 to 3, indicating that the pendant aryl radical Ar is substituted by from 1 to 3 of the groups subscribed by x in the formula. Such groups are joined directly (a is zero) or through bridging link A (a is 1) to the said pendant aryl radical. The defined dyestuffs may in this manner contain a greater number of such groups. This is because the pendant aryl nuclei Ar are much more susceptible of multiple substitution than are the nuclei in the phthalocyanine molecule per se. It is accordingly possible to produce phthalocyanine dyestuffs having two or more such groups substituted in the same aryl nucleus, with a correspondingly increased total number of groups equal to xn. The total number of terminal reactive groups is doubled when $R^1$ is CRR—X.

The above defined phthalocyanine dyestuffs employed in the process of this invention may be prepared by a number of different methods. One such method involves reaction of xn moles of a secondary amine compound of the formula

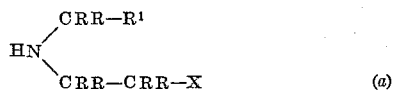
(a)

with one mole of a phthalocyanine compound containing a suitable reactive group substituted in a pendant aryl nucleus bridge linked to the phthalocyanine and having the formula

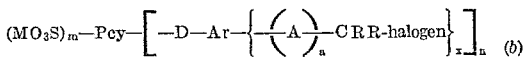
(b)

wherein halogen represents bromine, iodine, or preferably chlorine, and the remaining variables have the values given above. Compounds of Formula b may be prepared from precursors of the formula

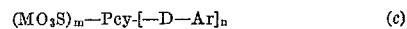
(c)

which precursors may be termed phthalocyanines bridge-linked to pendant aryl nuclei. Such precursors containing pendant aryl nuclei bonded to phthalocyanines through various types of bridging links D, and methods for their manufacture, are known and have been disclosed for example in U.S. Patents 2,795,583, 2,795,584, 2,542,328, 2,479,491, etc. Reactive groups of the formula

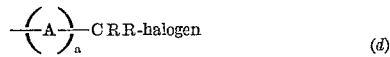
(d)

may be readily inserted into such pendant aryl nuclei in known manner. For example, the precursor of Formula c may be chloromethylated, as by reaction with bis-chloromethyl ether or the like, to insert from 1 to 3 —$CH_2Cl$ groups into each of the aryl nuclei Ar. Another method involves reaction of the precursor (c) with chlorosulfonic acid to insert —$SO_2Cl$ groups into the pendant aryl nuclei, often simultaneously with insertion of sulfonic acid groups into the pendant aryl nuclei or the fundamental nuclei of the phthalocyanine molecule, followed by reaction of the chlorosulfonated precursor with a halogenated organic amine such as β-chloro-ethylamine, gamma-chloro-propylamine, etc. Thus, reaction of β-chloro-ethylamine with the chlorosulfonated precursor (c) results in insertion of a reactive group (d) have the formula —$SO_2$—NH—$CH_2$—$CH_2$—Cl. Still another method involves reaction of precursor (c) with N-methylolchloroacetamide, resulting in insertion of a reactive group (d) having the formula —$CH_2$—NH—CO—$CH_2$—Cl Another method of preparing phthalocyanine dyestuffs operative herein involves reaction of n moles of a compound of the formula

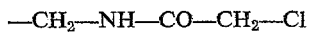

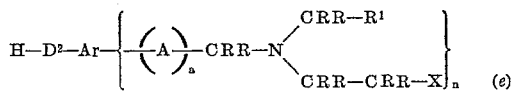
(e)

with one mole of a phthalocyanine compound having the formula

(f)

wherein $D^1$ and $D^2$ represent D when combined, and the remaining variables have the values given above. Compounds of the Formula f may be prepared by reacting a phthalocyanine, sulfonated or unsulfonated, with a chloromethylating agent, chlorosulfonic acid and a halogenated organic amine, or N-methylolchloroacetamide to insert similar groups into the phthalocyanine molecule Pcy. Another such method involves reaction of the phthalocyanine molecule with chlorosulfonic acid without subsequent reaction with a halogenated organic amine, whereby the reactive group —$SO_2Cl$ is inserted therein. Still another method involves reaction of an amino copper phthalocyanine containing 1 to 4 amino groups with β-chloropropionylchloride, resulting in compounds of the Formula f containing reactive groups of the formula —NH—CO—$CH_2$—$CH_2$—Cl.

Compounds of the Formula e may be prepared for example by reaction of p-nitrobenzylchloride with diethanol amine or other secondary amine compound of Formula a above, followed by reduction of the nitro group to amino as by catalytic hydrogenation under pressure in ethanol in the presence of platinum oxide catalyst (Adams) and reaction of the reduction product with HX or equivalent such as concentrated HCl, thionylchloride in chloroform, 100% sulfuric acid or the like. The resulting compound, when using for example diethanol amine and thionylchloride, has the formula

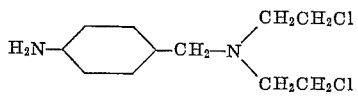

and, when using diethanolamine and sulfuric acid, has the formula

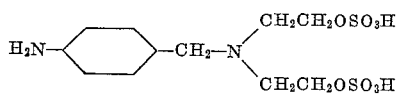

Correspondingly, other compounds of Formula e may be prepared by bis-chloromethylating p-nitrotoluene, reacting the resulting 2,6 - bischloromethyl-4-nitrotoluene with diethanol amine, reducing the nitro group in the resulting intermediate to the corresponding amine and reacting the reduced compound with thionylchloride or sulfuric acid to produce, respectively, compounds of the following formulae:

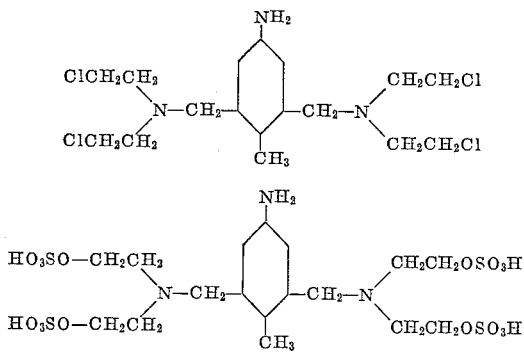

The above compounds of Formula e may be directly reacted with the compounds of Formula f producing dyestuffs operative herein containing a bridging link D having —HN— as the right hand terminus. By an alternative procedure, the above compounds of Formula e may be first diazotized and reduced in known manner to produce the corresponding hydrazine, which hydrazine is then reacted with the compound of Formula f to produce operative dyestuffs containing a bridging link D having the group —HNHN— as its right hand terminus.

Since the above reactions involve liberation of a hydrohalide, they are preferably carried out in the presence of an acid binding agent as defined below. It will also be understood that reactants may be employed containing in the secondary amine residue an OH group instead of the depicted X, in which event the final dyestuff must be reacted with HX or equivalent to substitute the OH group by X. Further, the above described dyestuffs employed herein may be sulfonated in known manner at any stage of their production to water solubilize same when necessary.

The phthalocyanine compounds employed in this invention are highly effective for coloring natural and synthetic fibers, particularly cellulosic textile fibers, in any desired shades of good to excellent fastness properties. The coloring process involves dyeing (including printing) the fibrous materials by application thereto under acid-binding conditions of an aqueous dispersion of the defined phthalocyanine compound at any temperature ranging from ambient temperatures to the boiling point of the medium. The dispersion may have a pH ranging from about 4 to 14 although alkaline conditions are preferred. It will be understood that as employed herein, the term "aqueous dispersion" is intended to include solutions, dispersions, or stable colloidal suspensions of the reactive phthalocyanine compound, appropriately thickened in known manner when employed in a printing process. The aqueous dispersion may be applied by immersion, jig dyeing, padding, spraying, printing or in any other desired manner.

Although aqueous dispersions are disclosed and claimed for use in the present process, it will be understood that this is only the preferred embodiment and that the water in the aqueous medium may be replaced in whole or in part by a water miscible, polar organic solvent such as acetone, alcohol, dioxane, dimethylformamide, or the like without departing from the scope of this invention. It will likewise be understood that the medium containing the reactive phthalocyanine compounds described above may contain adjuvants commonly used in dyeing processes as for example solution aids such as urea and thiodiglycol, migration inhibitors such as cellulose ethers, sodium chloride, sodium sulfate and other salts, wetting agents preferably of the nonionic surface active type as produced for example by polyoxyethylenation of such reactive hydrogen containing compounds as higher molecular weight alcohols, phenols, fatty acids, and the like, and thickening agents for the production of printing pastes such as methyl cellulose, starch, gum arabic, gum tragacanth, locust bean gum, sodium alginate, and the like.

The reaction between the reactive phthalocyanine compound and the fiber containing a reactive hydrogen atom involves liberation of acid HX and the reaction is accordingly favored by acid binding conditions. As acid binding agents which may be added to the dispersion of reactive phthalocyanine compounds, there may be mentioned generally alkali metal (sodium, potassium, lithium, etc.) hydroxide, carbonate, bicarbonate, phosphate, silicate, borate, acetate or the like, or an organic base such as triethanolamine or the like, in an amount sufficient to neutralize the liberated HX in whole or in part. Such amount may range from less than 0.5% up to 10% or more in the dispersion. It should be noted however quite often the provision of the required acid binding conditions does not require the addition of any of the above mentioned acid binding, alkaline reacting agents. This may occur in those instances wherein the reactive phthalocyanine compound, which is usually applied in concentrations of about 0.5% to 10% or more in the medium or o.w.f. (on the weight of the fiber), contains a relatively large number of bracketed substituents subscribed by $x$, the basic amino groups therein serving to bind the acid liberated in the reaction. In these instances, it is feasible and sometimes preferable to carry out the dyeing process under acidic conditions.

In carrying out the coloring process, the speed of reaction, and hence the time of contact between the fiber being dyed and the reactive phthalocyanine compound, will generally vary inversely with the temperature. The fiber may for example be continuously padded with the aqueous dispersion of reactive phthalocyanine compound, squeezed to, for example, a 50 to 200% liquid pickup, dried and heated at 200 to 500° F. for an hour or more to 30 seconds or less. Alternatively, the fiber may be allowed to remain in contact with the aqueous dispersion of reactive dyestuff until the reactive dyeing process is completed, which may range from 10 minutes or less to two hours or more, followed by washing and rinsing.

The process of this invention has been found to be highly effective for dyeing and printing cellulosic fibers of natural or synthetic type such as cotton, linen, wood, paper, regenerated cellulose and the like in any desired shades of good to excellent fastness properties. As a result of the reactive dyeing process of this invention, such dyed or printed cellulosic fibers may be ascribed the formula

wherein "Fiber" represents a cellulose molecule deprived of a reactive hydrogen atom as originally present for example in hydroxy groups therein. When a reactive phthalocyanine compound contains two or more fiber-reactive groups, a further fiber cross-linking reaction is made possible, whereby the product could be ascribed the formula

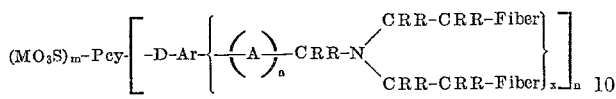

in which $n$ is for example 2 to 8 and the cellulose fibers may be the same or different.

In addition to cellulose and its derivatives, the process of this invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, —CRRH, etc. The resulting dyeings may be ascribed formulae similar to that of the cellulose dyeing described above. As representative of such other fibers, there may be mentioned natural and synthetic proteinaceous fibers such as wool, silk, leather, animal hides and skins, casein, and zein, polyamides such as the 6- and 66-nylons and polypyrrolidone, polyurethanes, polyesters, copolymers or homopolymers containing recurring carboxylic or cyano groups, polyvinyl alcohol, partially hydrolyzed cellulose acetate and polyvinyl acetate, polyvinyl chloride, and mixtures, copolymers and graft copolymers thereof. Mixed fabrics and fibers may likewise be so treated.

The fibers may be in any of the usual forms and in natural bulk, interwoven, knitted or felted form as for example in the form of staple fiber or continuous filaments in bulk form or in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention.

The following examples are only representative of the present invention and are not to be regarded as limitative. All parts and proportions referred to herein and in the appended claims are by weight unless otherwise indicated.

*Example 1*

A dyestuff is prepared by reacting two moles of a compound having the structural Formula $e$ last appearing above with one mole of copper phthalocyanine containing one sulfonic acid and two sulfonylchloride substituent groups. The resulting dyestuff has the formula

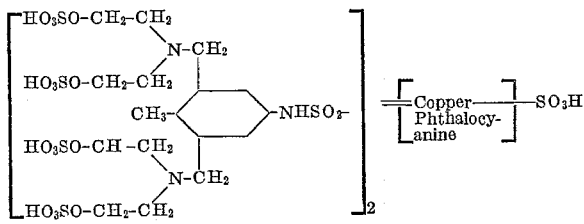

The cotton goods to be dyed are first scoured at 200° F. for 15 minutes in water using 1% sodium ethylenediamine tetraacetic acid and 1% Igepal CO-630 (polyoxyethylenated nonylphenol) o.w.f. (on the weight of the fiber). The goods are rinsed clear and added to water at a 1:20 liquor ratio. The temperature is held at 90° F. while 4% of the above dyestuff and 1% sodium hexametaphosphate o.w.f. are added. The temperature of the dye bath is increased to 150° F. in 30 minutes, 100% NaCl o.w.f. added and the temperature increased to 170° F. To the dye bath is then added 40% soda ash and 1% 30° Bé. NaOH o.w.f. The temperature of the bath is held at 195–200° F. for 1½ hours after which the goods are rinsed and boiled off in 1% soda ash and 1% Igepal CO-630 solution o.w.f.

The resulting dyeings are in powerful shades of turquoise possessing excellent wash fastness (fast to AATCC No. 3 wash test). Package cotton dyeings may also be run according to this procedure.

*Example 2*

3 parts of the dyestuff of Example 1 are dispersed in 100 parts of water containing 3 parts of soda ash. Prepared cotton sheeting is padded with this aqueous dye bath, squeezed and allowed to dry for 40 minutes at 210° F. The dyed cloth is boiled off in soap solution for several minutes, rinsed and dried. A very powerful dyeing of a bright turquoise shade is obtained having excellent wash fastness and light fastness.

Equivalent results are obtained when substituting 2 parts of caustic soda for the soda ash.

*Example 3*

The procedure of Example 2 is repeated except that instead of drying for 40 minutes at 210° F., the goods are processed through a curing range set at 300–310° F. for 3 minutes or 360° F. for 90 seconds. Similar results are obtained.

*Example 4*

3 parts of the dyestuff of Example 1 and 10 parts of urea are dissolved in 40 parts of water at 120–140° F. This solution is poured into 45 parts of sodium alginate thickener (4% solution) and 2 parts of soda ash are dissolved in the resulting paste at 80° F. Cotton goods are then printed with the paste, dried and steamed 5 to 10 minutes at atmospheric pressure in a neutral steamer. After aging, the goods are rinsed cold and soaped 5 minutes at the boil in a solution containing 2 lbs. soda ash and 2 lbs. Igepal CO-630 (polyoxyethylenated nonylphenol) per 100 gal. water. The goods are then rinsed and dried. Powerful prints of a bright turquoise shade are obtained having excellent wash fastness and light fastness.

*Example 5*

Cotton goods are printed as described in Example 4, but instead of steaming, the color is fixed by heating in an oven at a temperature of 200–360° F. Similar results are obtained.

In the above examples, the soda ash or caustic soda may be omitted and the dyeing carried out at a pH as low as 3.5. The dyestuff in each instance reacts with the fibers to produce dyeings and prints with excellent fastness properties although somewhat weaker shades are obtained.

This invention has been disclosed with respect to certain preferred embodiments and various modifications and variations thereof will become obvious to the person skilled in the art. It is to be understood that such modifications and variations are to be included within the spirit and scope of this invention.

We claim:
1. In a process for coloring fibers containing a reactive hydrogen atom, the step of treating the fibers:
   (1) under acid binding conditions, with
   (2) an aqueous dispersion of a
   (3) compound of the formula

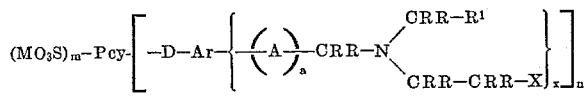

wherein
   (a) and $R^1$ are monovalent members of the group consisting of H, alkyl, alkynyl, alkenyl, cycloalkyl, aryl, and heterocyclic, and X-substituted derivatives thereof, (b) X is the anion of a strong acid having a dissociation constant greater than $2.0 \times 10^{-5}$,
(c) Pcy represents a phthalocyanine molecule,
(d) Ar is a pendant aryl radical selected from the group consisting of benzene, naphthalene and diphenyl,
(e) A and D represent divalent aliphatic bridging links selected from the group consisting of

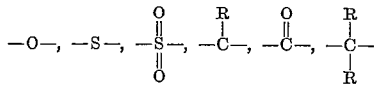

and combinations thereof, A being joined to the depicted CRR through a terminal carbon atom,
(f) M is selected from the group consisting of H, alkali, ammonium and amine cations,
(g) $m$ has a value of 0 to 3,
(h) $x$ has a value of 1 to 3,
(i) $a$ has a value of 0 to 1, and
(j) $n$ has a value of at least 1.

2. A process as defined in claim 1 and wherein $R^1$ is CRR—X.

3. A process as defined in claim 2 wherein R is H and X is $OSO_3H$.

4. A process as defined in claim 1 wherein the fibers are cellulose fibers.

5. A process as defined in claim 4 wherein $R^1$ is CRR—X.

6. A process as defined in claim 5 wherein R is H and X is $OSO_3H$.

7. A process as defined in claim 1 wherein Pcy represents copper phthalocyanine.

8. A process for coloring fibers containing a reactive hydrogen atom comprising treating the fibers:
(1) under acid binding conditions, with
(2) an aqueous dispersion of a
(3) compound of the formula

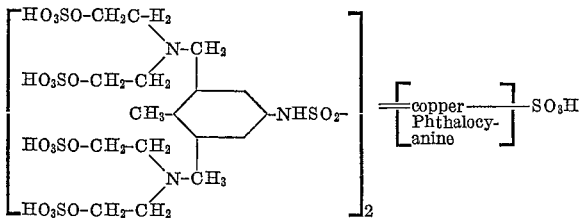

9. Fibers having the formula

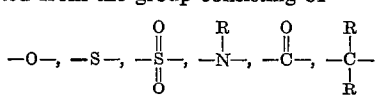

wherein
(a) R and $R^1$ are monovalent members of the group consisting of H, alkyl, alkynyl, alkenyl, cycloalkyl, aryl, and heterocyclic, and X-substituted derivatives thereof,
(b) X is the anion of a strong acid having a dissociation constant greater than $2.0 \times 10^{-5}$,
(c) Pcy represents a phthalocyanine molecule,
(d) Ar is a pendant aryl radical selected from the group consisting of benzene, naphthalene and diphenyl,
(e) A and D represent divalent aliphatic bridging links selected from the group consisting of

and combinations thereof, A being joined to the depicted CRR through a terminal carbon atom,
(f) M is selected from the group consisting of H, alkali, ammonium, and amine cations,
(g) $m$ has a value of 0 to 3,
(h) $x$ has a value of 1 to 3,
(i) $a$ has a value of 0 to 1,
(j) $n$ has a value of at least 1, and
(k) "Fiber" represents a fiber molecule deprived of a reactive hydrogen atoms.

10. Fibers as defined in claim 9 wherein "Fiber" represents cellulose.

11. Fibers having the formula

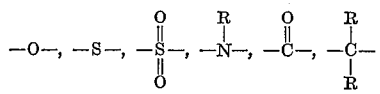

wherein
(a) R is a monovalent member of the group consisting of H, alkyl, alkynyl, alkenyl, cycloalkyl, aryl, and heterocyclic, and X-substituted derivatives thereof,
(b) X is the anion of a strong acid having a dissociation constant greater than $2.0 \times 10^{-5}$,
(c) Pcy represents a phthalocyanine molecule,
(d) Ar is a pendant aryl radical selected from the group consisting of benzene, naphthalene and diphenyl,
(e) A and D represent divalent aliphatic bridging links selected from the group consisting of

and combinations thereof, A being joined to the depicted CRR through a terminal carbon atom,
(f) M is selected from the group consisting of H, alkali, ammonium, and amine cations,
(g) $m$ has a value of 0 to 3,
(h) $x$ has a value of 1 to 3,
(i) $a$ has a value of 0 to 1,
(j) $n$ has a value of at least 1, and
(k) "Fiber" represents a fiber molecule deprived of a reactive hydrogen atom.

12. Fibers as defined in claim 11 wherein "Fiber" represents cellulose.

13. Fibers having the formula

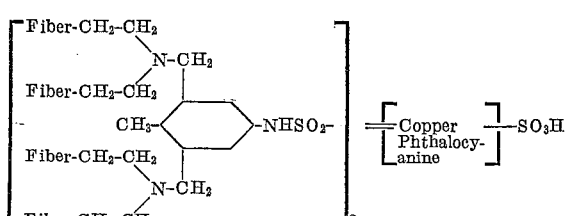

wherein "Fiber" represents a cellulose molecule deprived of a reactive hydrogen atom.

References Cited in the file of this patent
UNITED STATES PATENTS

| | | |
|---|---|---|
| 3,053,849 | Clark et al. | Sept. 11, 1962 |
| 3,062,830 | Buc et al. | Nov. 6, 1962 |

UNITED STATES PATENT OFFICE
CERTIFICATE OF CORRECTION

Patent No. 3,148,933            September 15, 1964

David I. Randall et al.

It is hereby certified that error appears in the above numbered patent requiring correction and that the said Letters Patent should read as corrected below.

Column 8, line 73, after "(a)" insert -- R --; column 9, lines 8 to 11, for the right-hand portion of the formula reading $$\begin{matrix} R \\ | \\ -C- \end{matrix} \quad \text{read} \quad \begin{matrix} R \\ | \\ -N- \end{matrix}$$

lines 47 to 53, after the right-hand bracket in the formula, insert a subscript -- n --.

Signed and sealed this 6th day of August 1968.

(SEAL)
Attest:

Edward M. Fletcher, Jr.           EDWARD J. BRENNER

Attesting Officer                Commissioner of Patents